United States Patent
Sugita

(10) Patent No.: US 6,838,207 B1
(45) Date of Patent: Jan. 4, 2005

(54) SEALED BATTERY WITH LESS ELECTROLYTE LEAKAGE

(75) Inventor: Nobuaki Sugita, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 468 days.

(21) Appl. No.: 09/528,986

(22) Filed: Mar. 20, 2000

(30) Foreign Application Priority Data

Mar. 19, 1999 (JP) ............................................. 11-076738

(51) Int. Cl.⁷ ............................ H01M 2/12; H01M 2/04
(52) U.S. Cl. ............................ 429/82; 429/72; 429/89
(58) Field of Search ............................ 429/53, 57, 185

(56) References Cited

U.S. PATENT DOCUMENTS

| 4,975,341 A | * | 12/1990 | Tucholski | 429/62 |
| 5,418,082 A | * | 5/1995 | Tak | 429/53 |
| 5,571,633 A | * | 11/1996 | Hagiuda | 429/100 |
| 5,702,840 A | * | 12/1997 | Byon | 429/89 |
| 5,707,756 A | * | 1/1998 | Inoue | 429/57 |
| 6,136,464 A | * | 10/2000 | Wakabe | 429/53 |

FOREIGN PATENT DOCUMENTS

JP 07022013 * 1/1995 ............ H01M/2/12

* cited by examiner

*Primary Examiner*—Mark Ruthkosky
(74) *Attorney, Agent, or Firm*—Armstrong, Kratz, Quintos, Hanson & Brooks, LLP

(57) ABSTRACT

The object of the present invention is to provide a sealed battery that includes a gas release valve formed on the closure cap by covering a gas release hole with a thin film that rarely breaks even if the battery is dropped. For this object, the external casing of the sealed battery includes a shielding member passing no drop of the electrolyte between the thin film and the generator element so as to form a gas channel from the internal space of the external casing to the gas release hole. When the sealed battery is dropped, electrolyte drops are pushed out of the generator element at the side opposed to the thin film. The thin film, however, is prevented from being directly hit by the drops due to the presence of the shielding member.

8 Claims, 3 Drawing Sheets

SEALED BATTERY WITH LESS ELECTROLYTE LEAKAGE

This application is based on an application No. 11-76738 filed in Japan, the content of which is hereby incorporated by reference.

BACKGROUND OF THE INVENTION

(1) Field of the Invention

The present invention relates to a sealed battery, especially to a sealed battery having a closure cap with a gas release valve that covers the opening of the external casing.

(2) Related Art/Description of the Conventional Art

Recently, sealed batteries have been used as the power source of portable electric appliances such as mobile phones, audiovisual devices, and computers.

As typical sealed batteries, alkaline batteries such as nickel-metal hydride batteries and nickel-cadmium batteries, and lithium-ion batteries are used. Usually, these sealed batteries are cylinder or rectangular-cylinder ones. Among them, rectangular-cylinder sealed batteries receive attention due to a space-saving advantage. More specifically, the shape of a rectangular-cylinder battery can be easily determined according to the inner space of a portable electric appliance.

An explanation of the construction of a sealed battery will be given below. The external casing of metal cylinder encloses a generator element. The generator element is an electrode that is composed of positive and negative electrodes impregnated with electrolyte. The opening of the external casing is covered by a closure cap. In order to prevent leakage of the electrolyte or gas, the closure cap is sealed. For this sealing, although mechanical caulking is adopted in many cases, laser welding is often adopted for rectangular-cylinder sealed batteries.

Meanwhile, in order to increase the energy density, the generator element and the closure cap are set fairly close to each other so that the generator element shares most of the internal space of the external casing. The external casing has been conventionally made of nickel-plated steel or stainless steel. Recently, however, light-weight batteries using an aluminum alloy for the external casing have been under development.

For the sealed battery, the closure cap or the external casing is provided with a gas release valve for releasing gas when the internal pressure of the battery has been increased to a certain level.

As the gas release valve for sealed batteries, a resilient valve is often used for alkaline batteries. For instance, a resilient valve that covers the gas release hole in the closure cap or the external casing with a valve plug using a spring and the like is often adopted. On the other hand, a non-resilient valve is often used for nonaqueous electrolyte batteries since high hermeticity is required. For instance, a non-resilient valve that covers the gas release hole in the metal closure cap by attaching a thin film (rupture) so as to cover the gas release hole as described in Japanese Laid-Open Patent Application No. 6-68861.

For the safety of portable electric appliances, the electrolyte should not leak even if sealed batteries are dropped.

In drop test, however, a problem is often found for sealed batteries with the closure cap provided with the non-resilient gas release valve. The thin film of the gas release valve is broken and the electrolyte leaks.

SUMMARY OF THE INVENTION

It is accordingly the object of the present invention to provide a sealed battery that includes a gas release valve formed on the closure cap by covering a gas release hole with a thin film that rarely breaks even if the battery is dropped.

The above-mentioned object may be achieved by a sealed battery that may include: a generator element that is an electrode group impregnated with electrolyte; an external casing that has an opening and encloses the generator element; a closure cap for sealing the opening the closure cap having a gas release valve that is formed by covering a gas release hole in the closure cap with a thin film; and a shielding member that is located between the thin film and the generator element to protect the thin film from the electrolyte so as to secure a gas channel from an internal space of the external casing to the gas release hole.

Here, "to secure a gas channel from an internal space of the external casing to the gas release hole" means that the shielding member does not prevent the release of gas inside of the external casing from the gas releasing hole when the pressure inside of the external casing increases to the level of the working pressure of the gas release valve that is formed by the thin film.

The present invention is made according to the learning described below.

The break of the thin film is tracked down when conventional sealed batteries that have the gas release valve on the closure cap are dropped. It is found that liquid drops of the electrolyte break the thin film as follows. At the impact of drop, liquid drops of the electrolyte with which the generator element is impregnated are pushed out of the generator element at the side of the closure cap. The interval between the closure cap and the generator element is set so small that liquid drops that has been pushed out at the side opposed to the thin film directly hit and break the thin film.

In the present invention, the sealed battery is provided with a shielding member in order to prevent liquid drops pushed out of the generator element at the side opposed to the thin film from hitting the thin film. Note that the shielding member is located so as to allow gas to flow from the internal space of the external casing to the gas release hole, so that the shielding member does not prevent gas release.

Considering of the fact that the thin film is often broken when vertically hit by liquid drops out of the generator element, it is preferable to determine the shape and location of the shielding member so as to at least prevent liquid drops out of the generator element from vertically hitting the thin film.

Meanwhile, the interval between the closure cap and the generator element is set considerably small, so that it is preferable to set a flat plate as the shielding member in parallel with the thin film.

In addition, it is preferable to determine the size of the shielding member as equal to or larger than the size of the thin film in order to prevent electrolyte drops from passing through the space from the generator element to the thin film.

In many cases, an insulating member is set between the generator element and the closure cap in a sealed battery in order to electrically separate the generator element and the closure cap. In this case, the shielding member can be easily set in the sealed battery by attaching the shielding member to the insulating member or by integrally forming the insulating member and the shielding member.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENT (Overall Structure of the Sealed Battery)

Figure 1:
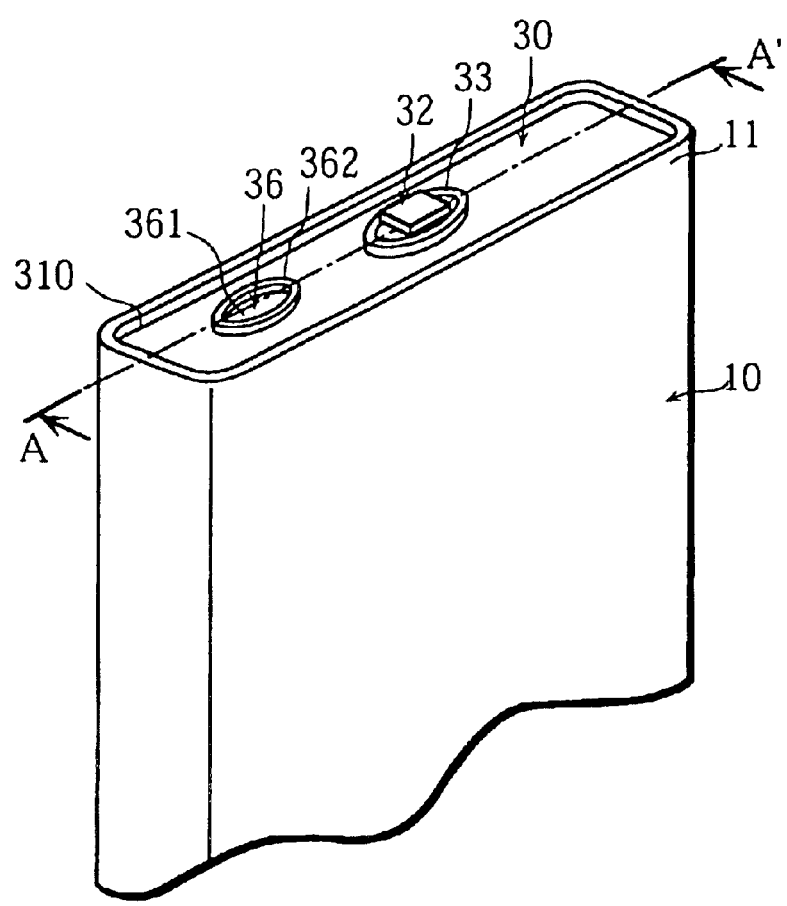
FIG. 1 is a perspective drawing of a rectangular-cylinder sealed battery according to the preferred embodiment of the present invention.
Figure 2:
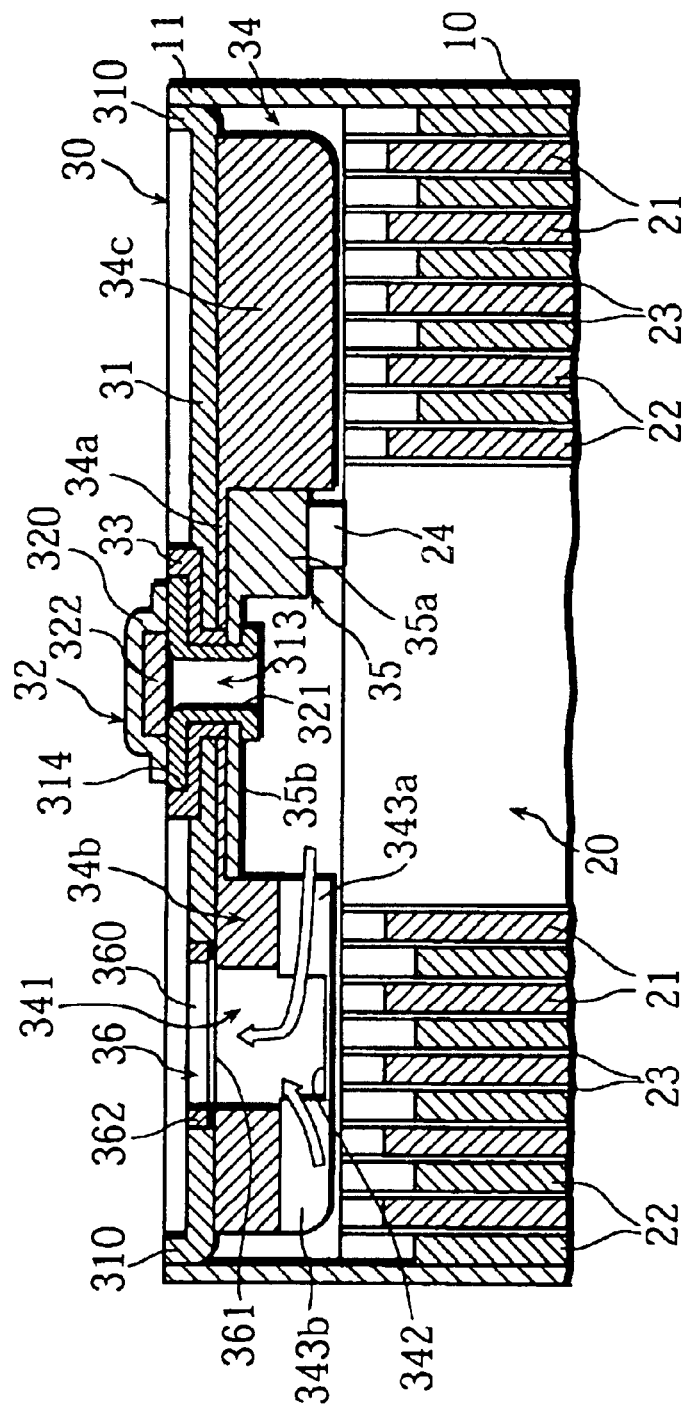
FIG. 2 is a vertical sectional view taken on line A–A' of FIG. 1.

FIG. 1 is a perspective drawing of a rectangular-cylinder sealed battery according to the preferred embodiment of the present invention. And FIG. 2 is a vertical sectional view taken on line A–A' of FIG. 1.

The rectangular-cylinder sealed battery is a lithium secondary battery. The sealed battery has the structure described below. An external casing 10 encloses a generator element. The generator element is a spirally wound electrode group 20 impregnated with nonaqueous electrolyte. The opening of the external casing 10 is covered by a closure cap 30.

The external casing 10 is a rectangular cylinder made of Al—Mn alloy. The major constituent of the Al—Mn alloy is aluminum, so that the external casing 10 is a light-weight one. In addition, the Al—Mn alloy is doped with manganese, so that the external casing possesses higher tensile strength than an aluminum simple substance.

As shown in FIG. 1, the closure cap 30 has the structure as follows. A rectangular cover plate 31 is formed so as to fit into the opening of the external casing 10. A negative electrode terminal 32 is attached to the cover plate 31 via a gasket 33 so as to cut through the cover plate 31. On the inner surface of the cover plate 31, an insulating plate 34 made of insulating resin is attached to. The insulating plate 34 keeps the electrode group 20 and the cover plate 31 separated by being positioned between the electrode group 20 and the cover plate 31. A more detailed explanation will be given later.

The cover plate 31 is made of the same aluminum alloy as the external casing 10 and has the same rectangular shape as the opening of the external casing 10. The outer edge of the cover plate 31 is bent to form a turned-up ridge 310. The turned-up ridge 310 and an opening edge 11 are welded together using a laser.

It is preferable to set the thickness of the external casing 10 and the cover plate 31 as thin as possible in order to maximize the capacity of the battery to the extent of keeping the strength. Generally, the thickness of the external casing 10 is set at about 0.5 mm, and the thickness of the cover plate 31 is set at about 0.8 mm. The cover plate 31 is thicker than the external casing 10 in order to prevent the deformation by the attachment of the negative electrode terminal 32.

The negative electrode terminal 32 includes a cap 320 and a cylindrical sleeve unit 321. In the cap 320, a rubber plate 322 is held for sealing the opening end of the sleeve unit 321.

At the center of the cover plate 31, a through hole 313 is formed so as to have the sleeve unit 321 go through the cover plate 31. On the outer surface of the cover plate 31, a groove 314 is formed so that the cap 320 fits into the groove 314.

To the sleeve unit 321 of the negative electrode terminal 32, electrode collector plate 35, which is composed of a protrusion 35a and a base 35b, is connected. The electrode collector plate 35 and the insulating plate 34 are fixed to the cover plate 31 by caulking at the sleeve unit 321 of the negative electrode terminal 32. The negative electrode terminal 32 and the electrode collector plate 35 are insulated from the cover plate 31 by the gasket 33 and the insulating plate 34.

The cover plate 31 is provided with a gas release valve 36 at a place between the center and the end. The gas release valve 36 is formed by attaching a thin film 361 to the cover plate 31 so as to cover a round gas release hole 360 in the cover plate 31. Having high hermeticity, and high resistance to pressure and heat, rolled metal foil is preferable for the thin film. Especially, the foil made of the same metal as the cover plate 31 is preferable. This is because a local cell is formed and corrosion is often caused if the thin film 361 and the cover plate 31 are made of different metals. The thickness of the metal foil is determined according to the desired working pressure. Usually, the thickness is about 20 to 30 μm.

The thin film 361 is attached to the cover plate 31 by cladding the thin film 361 on a ring 362 and welding the ring 362 and the edge of the gas release hole 360 together.

The electrode group 20 is formed by spirally winding the separator sandwiched between positive and negative electrodes 22 and 21 so as to form an elliptic cylinder.

The negative electrode 21 is formed by applying carbon with a layer structure (graphite powders) onto a plate. The negative electrode 21 is connected to the protrusion 35a of the electrode collector plate 35 via a lead plate 24. On the other hand, the positive electrode 22 is formed by applying positive mixture of oxide containing lithium (for instance, lithium cobaltate) and conductive material (for instance, acetylene black) is applied to a plate. The positive electrode 22 is directly connected to the external casing 10, which is the positive electrode terminal.

The nonaqueous electrolyte with which the electrode group 20 is impregnated is made by dissolving $LiPF_6$ as the solute in the mixed solvent of ethylene carbonate and dimethyl carbonate.

(Detailed Explanation of the Insulating Plate 34)

Figure 3:
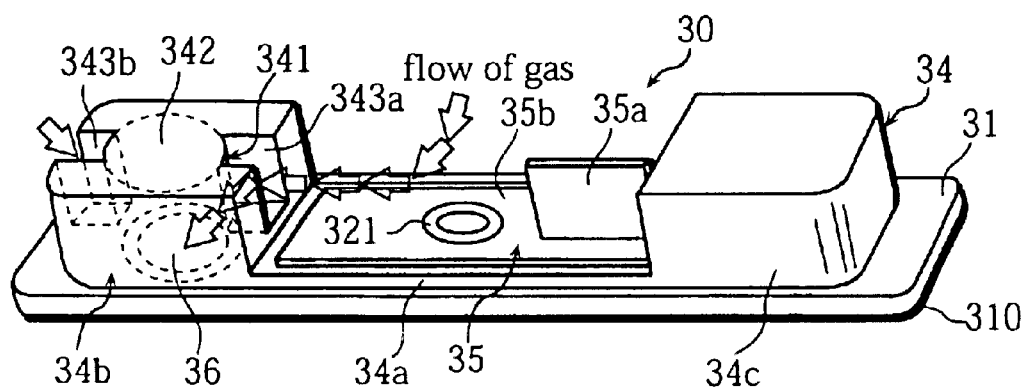
FIG. 3 is a perspective drawing of a closure cap 30 seen from the inside of the battery.

FIG. 3 is a perspective drawing of the closure cap 30 seen from the inside of the battery.

The insulating plate 34 is a rectangular plate a little bit smaller than the cover plate 31. A central part 34a of the insulating plate 34 is thin so as to be provided with the electrode collector plate 35. At the center of the central part 34a, a through hole is formed into which the sleeve unit 321 fits. End parts 34b and 34c is thick so as to keep the electrode group 20 and the electrode collector plate 35 separated. More specifically, the end parts 34b and 34c are formed so as to protrude further than the protrusion 35a.

Meanwhile, a cylindrical ventilation slot 341 is formed in the end part 34b, which faces the gas release hole 360. The ventilation slot 341 has the sectional face that is almost the same as the gas release hole 360 in order to secure a gas channel from the inside of the battery to the gas release hole 360.

One end of the ventilation slot 341 faces the gas release hole 360 and the other end is positioned just before the electrode group 20. The end just before the electrode group 20 is shielded by a shielding plate 342. The size of the shielding plate 342 is equal to or a little bit larger than that of the thin film 361.

In other words, the ventilation slot 341 cuts through the end part 34b from the side of the gas release hole 360 to the side of the electrode group 20, and the end on the side of the electrode group 20 is shielded by the shielding plate 342 just before the electrode group 20.

In addition, ventilation grooves 343a and 343b are formed as channels (bypasses) of gas (indicated by large arrows in FIG. 3) from the inside of the battery to the ventilation slot 341. Note that the ventilation groove 343a is a bypass between the ventilation slot 341 and the center part of the internal space of the battery, and the ventilation groove 343b is a bypass between the ventilation slot 341 and the part closer to the battery casing of the internal space.

(Method of Manufacturing Battery)

An explanation of the manufacturing method of the rectangular-cylinder sealed battery will be given below.

The external casing 10 is formed by deep-drawing an Al—Mn alloy plate to make a rectangular cylinder.

The cover plate 31 is formed in the manner as follows. First, an Al—Mn alloy plate is drawn to form the turned-up ridge 310, and the groove 314 is formed by casting. Then, the edge of the turned-up ridge 310, the through hole 313, and the gas release hole 360 are formed by stamping.

Next, the gas release valve 36 is formed on the cover plate 31. An aluminum foil is clad on the ring 362 made of aluminum by pressure welding. Then, the ring 362 is fit into the gas release hole 360, and the ring 362 and the gas release hole 360 are weld together with a laser.

The insulating plate 34 and the shielding plate 342 are integrally formed by injection molding a resin (for instance, polypropylene) that has resistance to the nonaqueous electrolyte.

The closure cap 30 is formed in the manner as follows. First, the insulating plate 34 is put on the cover plate 31, and the electrode collector plate 35 on the insulating plate 34. Then, the gasket 33 is fit into the through hole 313 in the cover plate 31, and the sleeve unit 321 of the negative electrode terminal 32 into the gasket 33. Next, the cover plate 31, the insulating plate 34, and the electrode collector plate 35 are caulked at the sleeve unit 321.

The electrode group 20 is formed in the manner as follows. First, the belt-shaped negative electrode 21 having the lead plate 24 is covered with the belt-shaped separator 23. Second, the belt-shaped positive electrode 22 is put on the separator 23. Then, the layers of the negative electrode 21, the separator 23, and the positive electrode 22 are spirally wound and pressed so as to form an elliptic cylinder.

Now, an explanation of how to assemble the external casing 10, the closure cap 30, and the electrode group 20 into the battery will be given below.

First, the electrode group 20 is inserted into the external casing 10, and the negative lead plate 24 and the protrusion 35a of the electrode collector plate 35 are welded together and electrically connected.

Then, the closure cap 30 are press-fit into the external casing 10, and the turned-up ridge 310 and the opening edge 11 of the external casing 10 are welded together by aiming a laser at the boundary between the turned-up ridge 310 and the opening edge 11.

Note that if the outer edge of the cover plate 31 is welded using a laser without forming the turned-up ridge 310, the amount of heat dissipation due to the heat transmission from the welded positions to the center of the cover plate 31 would be large. As a result, if less energy is applied at the time of laser welding, cracking would often occur at the welded positions. On the other hand, in the present invention, since the turned-up ridge 310 formed on the cover plate 31 is welded using a laser, heat is not directly transmitted from the welded positions to the center of the cover plate 31. As a result, heat dissipation from the welded positions is reduced. Accordingly, the heat stress at the welded positions is reduced, so that cracking can be suppressed even if less energy is applied.

Next, the nonaqueous electrolyte is injected into the external casing 10 from the sleeve unit 321 using a nozzle for injecting electrolyte.

Then, the cap 320 and the sleeve unit 321 are welded together while crimping the rubber plate 322 onto the opening end of the sleeve unit 321 to form the top of the negative electrode terminal 32.

(Effects of the Sealed Battery According to the Present Embodiment)

An explanation of the effects of the shielding plate 342 as in the present embodiment will be given below.

When the sealed battery is dropped and crashes on the floor, the nonaqueous electrolyte with which the electrode group 20 has been impregnated can be pushed out from the electrode group 20 by the impact of the crash. The nonaqueous electrolyte can leak from the cover plate 31 as liquid drops.

If the shielding plate 342 is not provided in the sealed battery, the ventilation slot 341 would be a vertical slot that directly connects the electrode group 20 and the thin film 361. Here, the distance between the electrode group 20 and the thin film 361 is small. After several crashes, it is highly possible that drops of the nonaqueous electrolyte pushed out of the electrode group 20 from one side opposed to the thin film 361 directly hit the thin film 361. This leads to the broke of the thin film 361.

On the other hand, when the shielding plate 342 is provided as in the case of the present embodiment, the thin film 361 is scarcely hit by nonaqueous electrolyte drops due to the presence of the shielding plate 342, even if nonaqueous electrolyte drops are pushed out of the electrode group 20 from the side opposed to the thin film 361. Especially, the thin film 361 is not hit by nonaqueous electrolyte drops directly. As a result, the thin film 361 is scarcely broken when the battery is repeatedly dropped on the floor.

In addition, the channels (bypasses) of gas between the internal space of the battery and the ventilation slot 341 are secured, and the shielding plate 342 is provided on the insulating plate 34 at the side facing the electrode group 20 distant from and in parallel with the thin film 361. This enables to secure the sectional areas of the ventilation grooves 343a and 343b that are large enough to pass gas. As a result, the gas release valve 36 can release gas without being obstructed by the shielding plate 342.

Furthermore, since the shielding plate 342 and the insulating plate 34 are integrally formed in the present embodiment, the shielding plate 342 is easily set at a predetermined place only by setting the insulating plate 34 in the battery. In addition, as a result of the injection molding, the shielding plate 342 needs not to be joined to the insulating plate 34.

(Possible Modifications and Supplemental Remarks)

While the shielding plate 342 and the insulating plate 34 are integrally molded in the present embodiment, it is possible to mold the shielding plate 342 and the insulating plate 34 separately and to join the shielding plate 342 to the insulating plate 34. Also in this case, the shielding plate 342 is set in a predetermined place only by setting the insulating plate 34 into the battery as in the case of the present embodiment.

Meanwhile, the shielding plate 342 needs not to be set on the insulating plate 34. For instance, it is possible to provide the insulating plate 34 with no shielding plate and instead to sandwich a shielding plate between the insulating plate 34 and the electrode group 20 at the time of assembly to shield the ventilation slot 341.

While the shielding plate 342 is not a porous plate made of resin in the present embodiment, it is enough for the shielding plate 342 to prevent nonaqueous electrolyte drops from leaking. As a result, a mesh component may be used as the shielding plate 342, for instance.

While the shielding plate 342 is a flat plate in the present embodiment, the shape of the shielding plate 342 is not limited to this example. When the ventilation slot 341, which vertically connects the gas release hole 360 and the electrode group 20, is shielded and channels of gas between the internal space of the battery and the gas release hole 360 are secured, the shielding component may have any shape.

Figure 4:
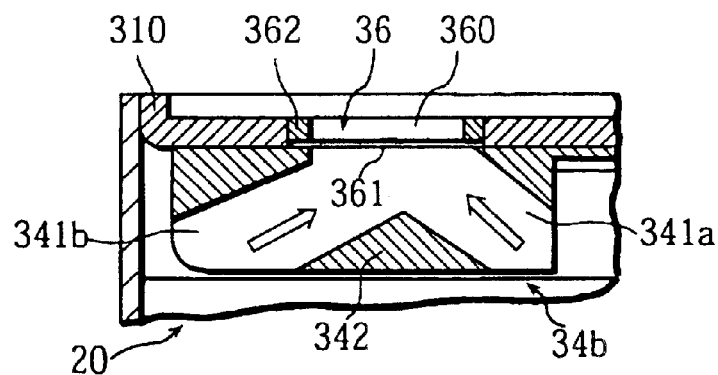
FIG. 4 shows a possible modification of the preferred embodiment of the present invention.

For instance, a mountain-shaped shielding component 342 may be formed between the thin film 361 and the electrode group 20 by forming the ventilation grooves 343a and 343b in a slanting direction from the gas release valve 36 to the electrode group 20 as shown in FIG. 4. In this case, nonaqueous electrolyte drops pushed out of the electrode group 20 may hit the thin film 361 in a slanting direction when the battery is dropped on the floor. Nonaqueous electrolyte drops from the electrode group 20, however, never hit the thin film 361 vertically. As a result, the thin film 361 can be prevented from being broken by nonaqueous electrolyte drops in many cases.

While aluminum alloy is used for the cover plate 31 in the present embodiment, stainless and the like can be used for the cover plate 31.

Meanwhile, the thin film 361 can be made of a metal foil of stainless steel and nickel, and a PP and PE film according to the type of battery.

While a lithium secondary battery has been explained as an example in the present embodiment, the present invention is applicable to other secondary batteries such as nickel-metal hydride battery or primary cells.

While a rectangular-cylinder sealed battery has been explained in the present embodiment, the present invention is applicable to cylinder sealed batteries.

PRACTICAL EXAMPLE

According to the embodiment, a rectangular-cylinder sealed battery (height: 48 mm; width: 30 mm; and thickness: 10 mm) is manufactured.

The cover plate 31 is made of an aluminum alloy plate that is about 0.8 mm in thickness. The gas release hole 360 is 3 mm in diameter. The thin film 361 is made of a aluminum foil that is 30 $\mu$m in thickness.

COMPARATIVE EXAMPLE

A rectangular-cylinder sealed battery that is different from the practical example in not providing the insulating plate 34 with the shielding plate 342 is manufactured as the comparative example.

[Experiment]

A drop test is conducted for the batteries of the practical and comparative examples. In the drop test, 100 practical batteries and 100 comparative batteries are dropped upside down from a height of 1.5 m onto the concrete floor, and the number of batteries in which the thin film is broken is counted.

The result of the experiment is shown in Table 1.
(Table 1)

Table 1 shows that while the thin film breaks at a high ratio for the comparative example, no thin film breaks for the practical example.

As has been explained, when a sealed battery provided with a gas release valve using a thin film is dropped, the thin film can be prevented from being broken according to the present invention.

In many cases, a nonaqueous electrolyte battery, especially a rectangular-cylinder nonaqueous electrolyte battery is provided with a gas release valve using a thin film, so that the present invention is effective to improve the performance of nonaqueous electrolyte batteries, especially rectangular-cylinder nonaqueous electrolyte batteries.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A sealed battery, comprising:
   a generator element that is an electrode group impregnated with electrolyte;
   an external casing that has an opening and encloses the generator element;
   a closure cap for sealing the opening, the closure cap having a gas release valve that is formed by covering a gas release hole in the closure cap with a thin film; and
   a shielding member that is located between the thin film and the generator element to protect the thin film from the electrolyte so as to secure a gas channel from an internal space of the external casing to the gas release hole.

2. The sealed battery according to claim 1, wherein a space is provided between the shielding member and the thin film to allow gas to flow from the internal space of the external casing to the gas release hole.

3. The sealed battery according to claim 2, wherein the shielding member is a plate set in parallel with the thin film.

4. The sealed battery according to claim 3, wherein a size of the shielding member relative to a diameter of the gas release hole is equal to or greater than the thin film.

5. The sealed battery according to claim 1, wherein the shielding member prevents electrolyte that escapes from the generator element from perpendicularly hitting the thin film.

6. The sealed battery according to one of claims 1 to 5, wherein
   an insulating member is set between the generator element and the closure cap so as to electrically separate the generator element and the closure cap, and
   the shielding member is held by the insulating member.

7. The sealed battery according to one of claims 1 to 5, wherein
   an insulating member is set between the generator element and the closure cap so as to electrically separate the generator element and the closure cap, and
   the shielding member is attached to the insulating member.

8. The sealed battery according to one of claims 1 to 5, wherein,
   an insulating member is set between the generator element and the closure cap so as to electrically separate the generator element and the closure cap, and
   the shielding member and the insulating member are integrally formed.

* * * * *